United States Patent
Morita et al.

(10) Patent No.: US 8,381,902 B2
(45) Date of Patent: Feb. 26, 2013

(54) BELT MEANDERING PREVENTING DEVICE AND BELT MEANDERING PREVENTING METHOD FOR RUNNING TEST DEVICE

(75) Inventors: Takashi Morita, Kobe (JP); Takashi Hiekata, Kobe (JP); Yoshiharu Nishida, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 91 days.

(21) Appl. No.: 12/736,857

(22) PCT Filed: May 28, 2009

(86) PCT No.: PCT/JP2009/059775
§ 371 (c)(1),
(2), (4) Date: Nov. 17, 2010

(87) PCT Pub. No.: WO2009/145258
PCT Pub. Date: Dec. 3, 2009

(65) Prior Publication Data
US 2011/0066291 A1 Mar. 17, 2011

(30) Foreign Application Priority Data

May 28, 2008 (JP) .................. 2008-139487
Nov. 18, 2008 (JP) .................. 2008-294587

(51) Int. Cl.
*B65G 39/16* (2006.01)
(52) U.S. Cl. .................. 198/807; 198/810.03
(58) Field of Classification Search .................. 198/806, 198/807, 810.03
See application file for complete search history.

(56) References Cited

U.S. PATENT DOCUMENTS

| | | | | |
|---|---|---|---|---|
| 4,572,417 A * | 2/1986 | Joseph et al. | ................. | 198/807 |
| 4,959,040 A * | 9/1990 | Gardner et al. | ............... | 198/807 |
| 5,096,044 A * | 3/1992 | Biebel | ............................ | 198/807 |
| 5,515,139 A * | 5/1996 | Hou et al. | ..................... | 198/807 |
| 5,964,339 A * | 10/1999 | Matsuura et al. | ........ | 198/810.03 |
| 6,852,050 B2 * | 2/2005 | Sands et al. | ............. | 198/810.03 |
| 7,823,720 B2 * | 11/2010 | Tabata et al. | ............. | 198/810.03 |
| 2011/0066291 A1 | 3/2011 | Morita et al. | | |

FOREIGN PATENT DOCUMENTS

| JP | 54-037004 | 3/1979 |
|---|---|---|
| JP | 55-135956 U | 9/1980 |

(Continued)

OTHER PUBLICATIONS

International Search Report for Application PCT/JP2009/059775 mailed Aug. 4, 2009.
Office Action, from the State Intellectual Property Office of People's Republic of China, issued in corresponding Chinese Application No. 200980119264.6, issued Jan. 5, 2012, pp. 1-9.

(Continued)

*Primary Examiner* — James R Bidwell
(74) *Attorney, Agent, or Firm* — Stites & Harbison, PLLC; Juan Carlos A. Marquez, Esq (57) ABSTRACT

A belt meandering preventing device 1 for a running test device 2 is provided with a first control means 14, a second control means 15, and a third control means. The first control means 14 detects the position of a belt 6 and controls a drum rocking means 8 so that the difference between the detected position of the belt 6 and a predetermined target position is zero. The second control means 14 detects the amount of rocking of a driven drum 5 rocked by the drum rocking means 8 and controls the drum rocking means 8 so that the detected amount of rocking of the driven drum 5 is a target amount of rocking.

10 Claims, 10 Drawing Sheets

FOREIGN PATENT DOCUMENTS

| | | |
|---|---|---|
| JP | 55-135956 | 10/1980 |
| JP | 63-167912 | 7/1988 |
| JP | 01-251210 | 10/1989 |
| JP | 1-251210 A | 10/1989 |
| JP | 03-032550 | 2/1991 |
| JP | 2551722 Y2 | 10/1997 |
| JP | 2798928 B2 | 9/1998 |
| JP | 2004-359379 | 12/2004 |
| JP | 2005-326638 | 11/2005 |
| JP | 2005-351302 | 12/2005 |
| JP | 2009-288006 | 12/2009 |

OTHER PUBLICATIONS

Office Action, from the Korean Patent Office, issued in corresponding Korean Patent Application No. 10-2010-7026537, mailed Aug. 2, 2012, in Korean, 5 pages, and its English translation, 4 pages.

Office Action issued from the Japanese Patent Office, in corresponding Japanese Patent Application No. 2008-294587, mailed May 8, 2012, 2 pages in Japanese, and 3 pages in its English translation.

Office Action issued from the Japanese Patent Office, in corresponding Japanese Patent Application No. 2008-139487, mailed May 8, 2012, 3 pages in Japanese, and 8 pages in its English translation.

* cited by examiner

BELT MEANDERING PREVENTING DEVICE AND BELT MEANDERING PREVENTING METHOD FOR RUNNING TEST DEVICE

TECHNICAL FIELD

The present invention relates to a belt meandering preventing device and a belt meandering preventing method for a running test device.

BACKGROUND ART

A running test device that evaluates the running characteristic of a rolling element, a tire or a vehicle, by using a metal belt is known. The running test device includes a driven drum and a driving drum, and an endless belt is laid between the driven drum and the driving drum. In the running test device, an upper flat surface of the belt serves as a test road surface. By running the belt while the rolling element is in contact with the test road surface, the running characteristic of the rolling body is evaluated.

While the driven drum and the driving drum are formed to have a truly round cross section, these drums are microscopically not truly round. Moreover, it is difficult to arrange two drums in strictly parallel, and the belt has fine irregularities. For this reason, the belt laid between the two drums meanders or deviates inevitably.

Accordingly, for example, Patent Documents 1 to 3 disclose devices that detect the position of an end of a belt and that correct meandering by tilting a driven drum or adjusting the tension on the basis of the detected belt position.

[Patent Document 1] Japanese Unexamined Patent Application Publication No. 2004-359379

[Patent Document 2] Japanese Unexamined Patent Application Publication No. 2005-351302

[Patent Document 3] Japanese Unexamined Patent Application Publication No. 2005-326638

DISCLOSURE OF INVENTION

Problems to be Solved by the Invention

For example, even when the drum is tilted, the locus of the belt rotating on the drums changes only when the belt makes at least about one rotation. Hence, the locus change of the belt has an even higher time constant than a servomotor or hydraulic cylinder that is generally used for tilting the drum. For this reason, in the devices of Patent Documents 1 to 3, even when the driven drum is rocked, the belt does not immediately move to the target position. In this case, the influence of response delay may remain in the nest control period, and result in insufficient control over the belt position.

In addition, it is known, from previous findings, that, immediately after the drum is rocked, a transient phenomenon in which the belt responds in a direction opposite a direction toward the target position occurs in the belt. If such a transient phenomenon occurs, an unnecessary displacement amount resulting from the transient phenomenon is added to the detected deviation amount of the belt, position, and the control may cause meandering and oscillation of the belt position.

The present invention has been made in view of the above-described problems, and an object of the invention is to provide a belt meandering preventing device and meandering preventing method for a running test device that can quickly correct a belt to a target position and can reliably prevent meandering and vibration of the belt.

Means for Solving the Problems

The present inventors thought that, if the time constant of a belt was considerably higher than the time constant of a drum rocking means, it should be better to further improve the responsiveness of the drum rocking means having the low time constant. Further, the present inventors found that the belt could be quickly corrected to the target position by controlling the drum rocking means on the basis of the amount of rocking of the drum, and accomplished the present invention.

According to a first aspect of the present invention, there is provided a belt meandering preventing device, for a running test device, which is provided in the running test device that evaluates a running characteristic of a rolling element while the rolling element is in contact with a belt laid between a pair of drums, and which corrects meandering of the belt by drum rocking means that rocks, relative to one of the drums, the other drum and that changes a position of the belt in accordance with an amount of rocking of the other drum. The belt meandering preventing device includes first control means that detects the position of the belt and controls the drum rocking means so that a difference between the detected position of the belt and a predetermined target position becomes zero; and second control means that detects the amount of rocking of the other drum rocked by the drum rocking means and controls the drum rocking means so that the detected amount of rocking of the drum becomes a target amount of rocking.

The belt meandering preventing device for the test running device according to the present invention includes not only the first control means that controls the drum rocking means on the basis of the detected position and the target position of the drum, but also the second control means that controls the drum rocking means on the basis of the detected amount of rocking and the target amount of rocking of the drum. Since this structure further improves the responsiveness of the drum rocking means having a low time constant, the belt can be quickly corrected to the target position, and meandering and vibration of the belt can be prevented reliably.

More specifically, the second control means detects the amount of rocking of the other drum, calculates a difference between the detected amount of rocking and the target amount of rocking, and feeds back the difference in the amount of rocking to an input side of the drum rocking means. Further, the first control means calculates the difference between the detected position and the target position of the belt, and feeds back the difference to the input side of the drum rocking means.

The present inventors thought that, if the response of the belt delayed or the belt responded in a direction opposite the target position, an accurate detected position of the drum could be obtained by setting a belt response model that simulates such response of the belt and grasping a deviation state of the belt on the basis of the belt response mode. Then, the present inventors found that the belt could be quickly corrected to the target position by controlling the drum rocking means using the detected position of the belt calculated by inputting the amount of rocking of the drum to the belt response model.

That is, more preferably, the belt meandering preventing device further includes third control means that calculates a difference between an estimated position of the belt obtained by inputting the amount of rocking of the drum detected by the second control means to a belt response model and a measured position of the belt detected by belt-position detecting means, calculates an integral value obtained by integrating the amount of rocking of the drum, and calculates a detected position of the belt on the basis of the difference and the integral value.

According to this structure, an accurate detected position of the belt is found from the deviation state of the belt grasped by the third control means on the basis of the belt response model. The first control means controls the drum rocking means on the basis of the accurate detected position of the belt and the target position of the drum. As a result, the belt can be more quickly corrected to the target position, and meandering and vibration of the belt can be more reliably prevented.

More specifically, the belt response model simulates a response behavior of the belt in a direction opposite the target position and/or response delay of the belt.

More specifically, the first control means includes PID control means that calculates a target amount of rocking of the drum rocking means from the difference between the detected position and the target position of the belt. Further, the amount of rocking is a rocking angle or a rocking angular velocity of the other drum.

According to a second aspect of the present invention, there is provided a belt meandering preventing method for a running test device, which corrects meandering of a belt laid between a pair of drums by drum rocking means that is provided in the running test device for evaluating a running characteristic of a rolling element while the rolling element is in contact with the belt and that rocks, relative to one of the drums, the other drum, and that changes a position of the belt in accordance with an amount of rocking of the other drum. The belt meandering preventing method detects the position of the belt and controls the drum rocking means so that a difference between the detected position and a predetermined target position of the belt becomes zero, and detects the amount of rocking of the other drum rocked by the drum rocking means and controls the drum rocking means so that the detected amount of rocking of the drum becomes a target amount of rocking.

Preferably, the method finds a difference between an estimated position of the belt found by inputting the amount of rocking of the drum to a belt response model and a measured position of the drum actually detected, and finds the detected position of the belt on the basis of an integral value of the amount of rocking of the drum and the difference.

Advantages

The belt meandering preventing device and meandering preventing method of the present invention can quickly correct the belt to the target position and thereby reliably prevent meandering and vibration of the belt.

BRIEF DESCRIPTION OF DRAWINGS

FIG. 4($a$) shows the change in a belt position in a comparative example, and FIG. 4($b$) shows the displacement of a belt position in an example.
FIG. 9($a$) shows the change in belt position when control is performed by a belt meandering preventing device of the example, and FIG. 9($b$) shows the change in belt position when control is performed by a belt meandering preventing device of the comparative example.

| Reference Numerals | |
|---|---|
| 1 | belt meandering preventing device |
| 2 | tire test device |
| 3 | driving motor |
| 4 | driving drum |
| 5 | driven drum |
| 6 | belt |
| 7D | lower flat surface |
| 7U | upper flat surface |
| 8 | drum rocking means |
| 9 | control unit |
| 10 | frame member |
| 11 | servomotor |
| 12 | rocking shaft portion |
| 13 | rocking-amount detecting means |
| 14 | first control means |
| 15 | second control means |
| 16 | third control means |
| 17 | PID control means |
| 21 | belt-position detecting means |
| 31 | first control unit |
| 32 | second control unit |
| 33 | third control unit |
| R1, R2 | rotation shaft |
| R3 | rocking axis |
| T | tire |

BEST MODES FOR CARRYING OUT THE INVENTION

A meandering preventing device and meandering preventing method for a running test device according to an embodiment of the present invention will be described in detail below with reference to the drawings.

First Embodiment

Figure 1:
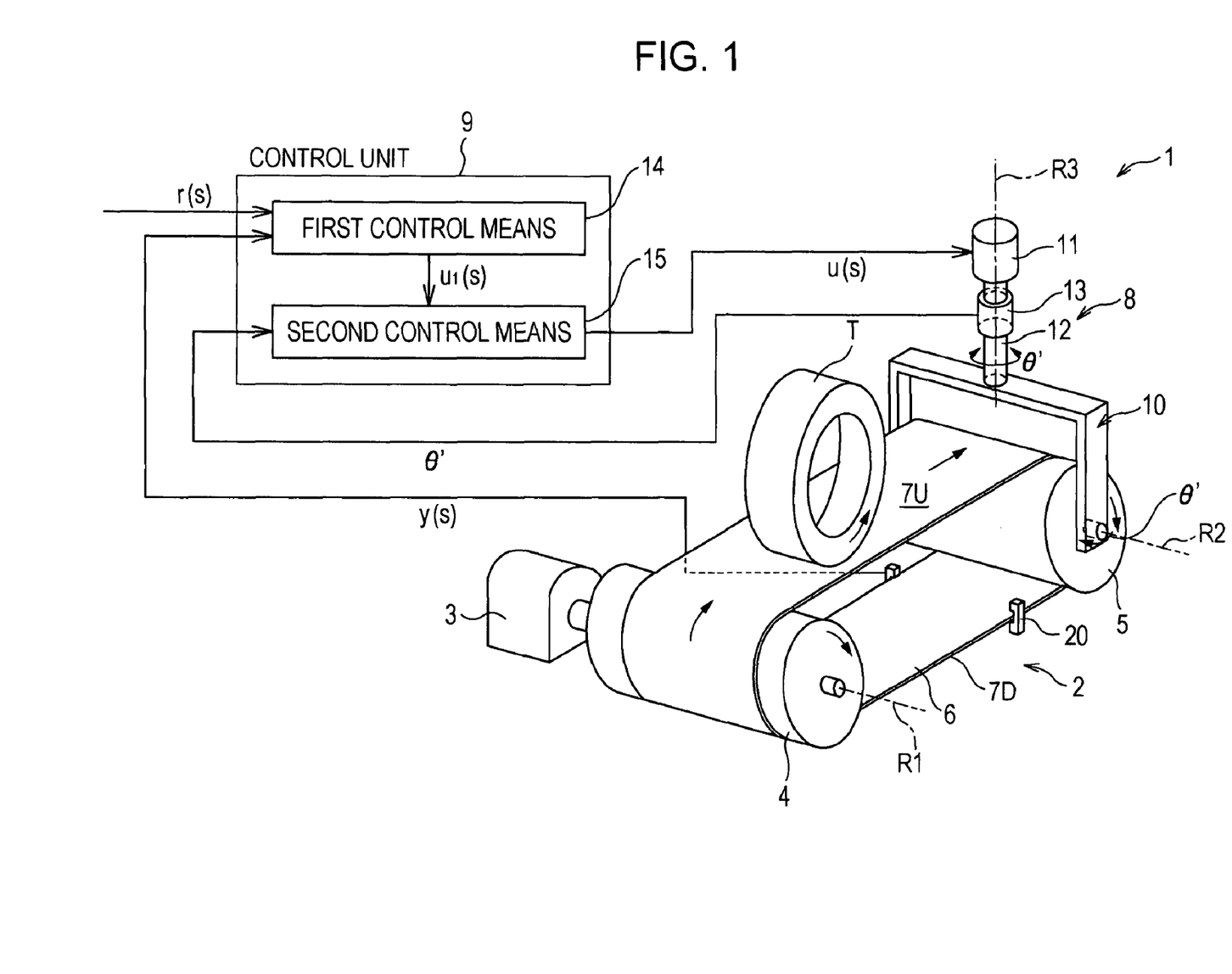
FIG. 1 is a perspective view of a tire test device According to an embodiment.

FIG. 1 illustrates a tire test device 2 (running test device) provided with a belt meandering preventing device 1 according to an embodiment.

The tire test device 2 includes a driving drum 4 that is connected to a driving motor 3 so as to be rotatable in forward and reverse directions, a driven drum 5 provided at a distance from the driving drum 4 in a manner such that the axes of the driving drum 4 and the driven drum 5 are parallel to each other, and a belt 6 formed by an endless metal plate laid between the driving drum 4 and the driven drum 5. The belt 6 has two upper and lower flat surfaces 7U and 7D between the driving drum 4 and the driven drum 5. A tire T (rolling element) is in contact with a road surface (test road surface) provided on the upper flat surface 7U. The tire test device 2 is configured to evaluate the running characteristic of the tire T while the tire T is in contact with the road surface on the belt 6.

In the following description, upper and lower sides of the paper of FIG. 1 are defined as upper and lower sides of the tire test device 2. Further, a left end side in a feeding direction of the belt 6 passing over the driving drum 4 toward the driven drum 5 is defined as the left side in the description of the tire test device 2 and the belt meandering preventing device 1, and a right end side is defined as the right side in the description of the tire test device 2 and the belt meandering preventing device 1. The feeding direction of the belt 6 from the driving drum 4 in FIG. 1 is referred to as a forward direction, and a direction opposite the forward direction is referred to as a reverse direction.

The driving drum 4 has a cylindrical shape around which the belt 6 can be wound. The driving drum 4 is rotatable on a rotation shaft R1 extending in the right-left direction, and can be selectively rotated in the forward and reverse directions by the driving motor 3 connected to the rotation shaft R1 via a gear box (not shown).

The driven drum 5 is provided at a distance from the driving drum 4 in the horizontal direction in a manner such that the axes of the drums are parallel to each other. Similarly to the driving drum 4, the driven drum 5 can freely rotate on a rotation shaft R2 extending in the right-left direction.

The belt 6 is formed by an endless metal band plate, a crawler, or the like, and is wound around both the driving drum 4 and the driven drum 5. A surface of the belt 6 facing toward the outer periphery is formed of a material such as asphalt or concrete. The belt 6 has the upper flat surface 7U and the lower flat surface 7D between the driving drum 4 and the driven drum 5. In this embodiment, the tire T to be tested is in contact with the upper flat surface 7U from above. A layer of snow, ice, or water may be provided on the surface of the belt 6 facing toward the outer periphery so that the surface facing toward the outer periphery is in placed in an environment similar to that for the actual road surface.

Figure 2:
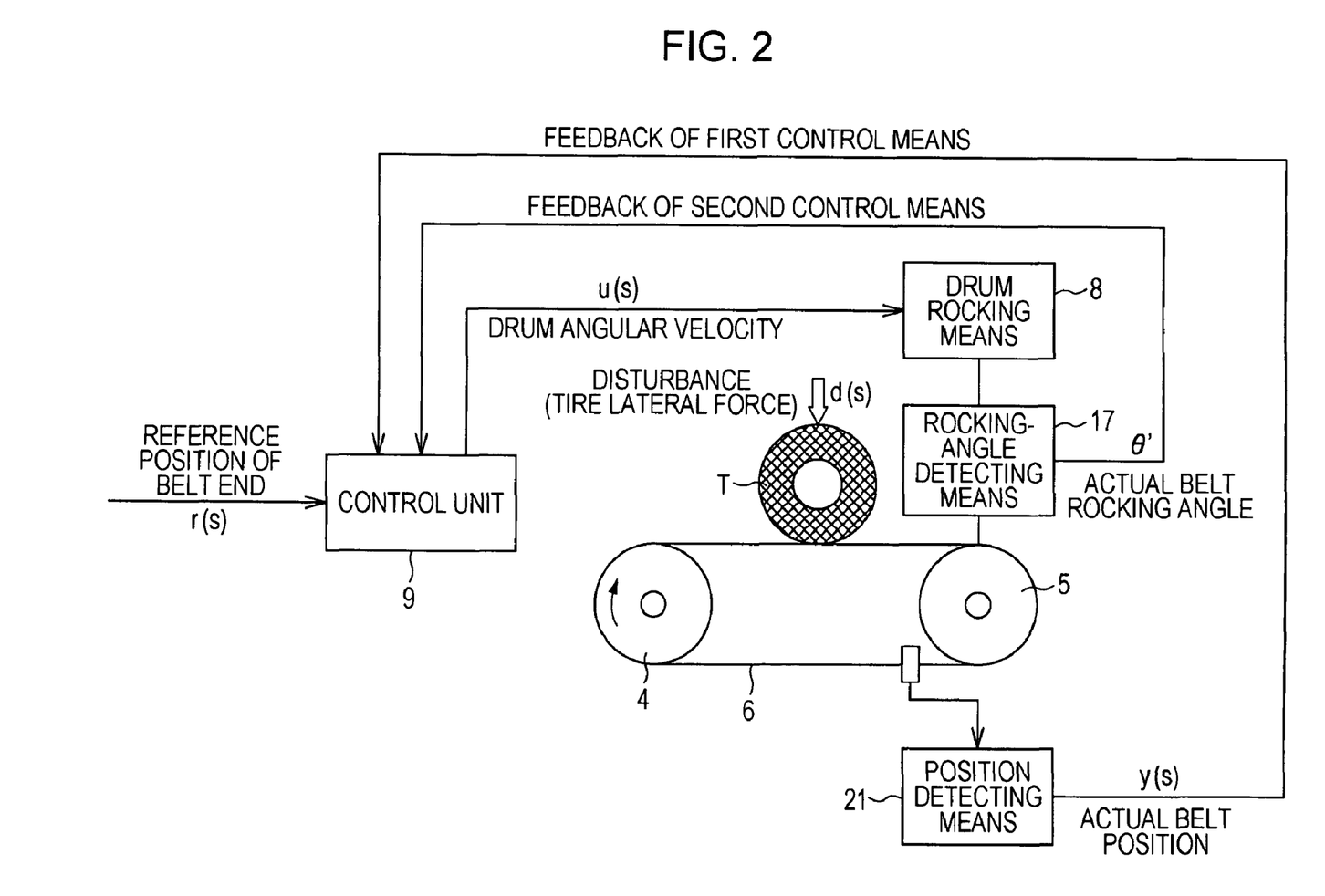
FIG. 2 is a block diagram showing the flow of signals in a meandering preventing device.

As illustrated in FIGS. 1 and 2, the belt meandering preventing device 1 of the embodiment corrects meandering of the belt 6 by rocking the driven drum 5, of the driving drum 4 and the driven drum 5 provided in the tire test device 2, relative to the driving drum 4. The belt meandering preventing device 1 includes a drum rocking means 8 that rocks the driven drum 5 relative to the driving drum 4 on a rocking axis R3 extending in the up-down direction and changes the position of the belt 6 in accordance with the amount of rocking, and a control unit 9 that controls the drum rocking means 8.

The drum rocking means 8 rocks the driven drum 5 on the axis (rocking axis) extending in the up-down direction, and includes a frame member 10 that supports the driven drum 5 from both ends, and a servomotor 11 that rocks the frame member 10.

The frame member 10 has a substantially angular U-shape pointing downward, and the driven drum 5 is rotatably attached to lower ends thereof. The frame member 10 has a rocking shaft portion 12 projecting upward, and can be rotated on the rocking axis R3 extending in the up-down direction by the servomotor 11 provided at an upper end of the rocking shaft portion 12. A rocking-amount detecting means 13 is provided in a portion of the rocking shaft portion 12 in the up-down direction, and can detect the relative rotation angle on the rocking axis R3 between the servomotor 11 and the rocking shaft portion 12.

The control unit 9 is formed by a computer or a sequencer, and includes a first control means 14 and a second control means 15.

The first control means 14 controls the drum rocking means 8 so that the difference between an actual position of the belt 6 and a predetermined target position becomes zero.

Figure 3:
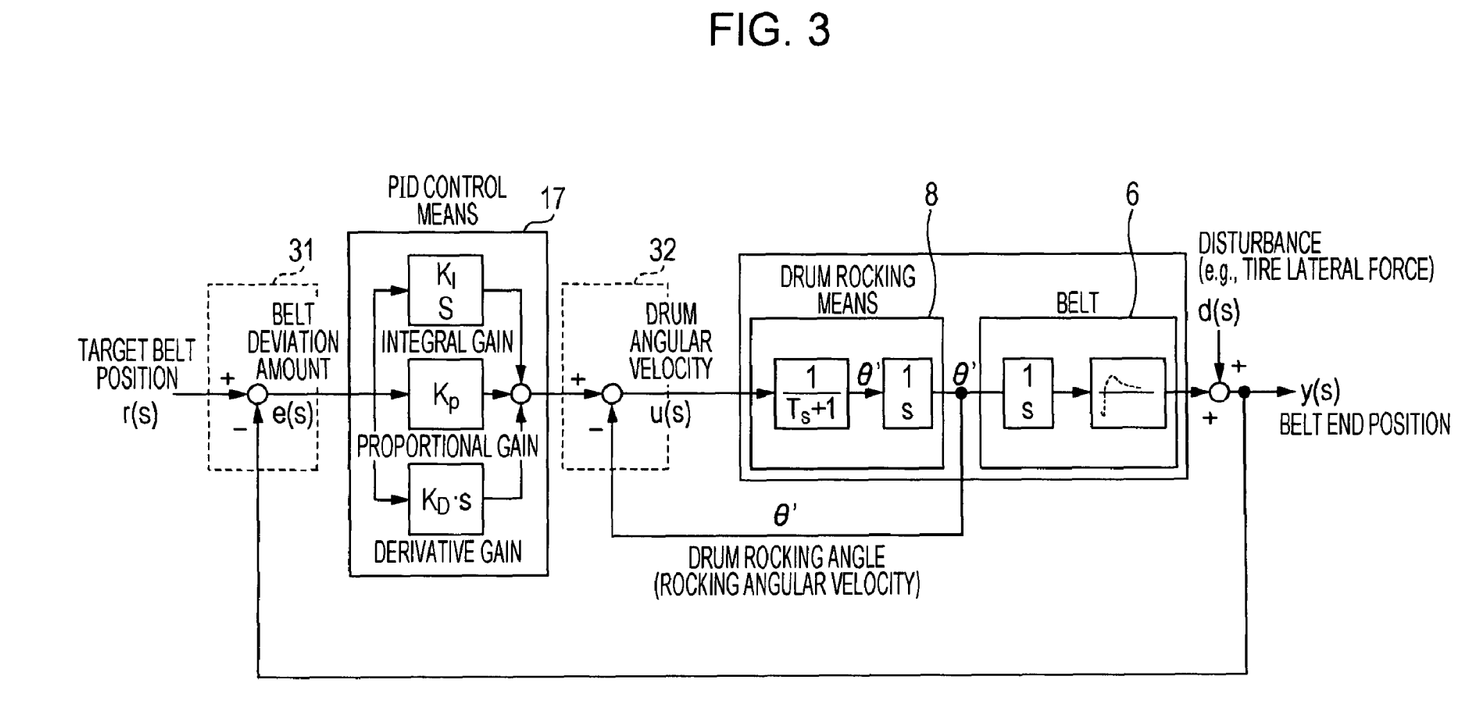
FIG. 3 is a block diagram showing the flow of signals in a control unit.

The first control means 14 includes belt-position detecting means 21 that detect a measured position y(s) of the belt 6, a first control unit 31 that calculates the deviation amount between the actual position and the target position of the belt 6, and a PID control means 17 that calculates a target amount of rocking from the deviation amount between the actual position and the target position of the belt 6 detected by the first control unit 31 and outputs the calculated target amount of rocking to the drum rocking means 8.

The belt-position detecting means 21 are provided at the left and right ends of the lower flat surface 7D of the belt 6, respectively, and at a predetermined distance from the flat surface 7D. The belt-position detecting means 21 are formed by optical sensors that detect the right and left ends of the belt 6 by light transmission, and measure, from the change in amount of transmitted light, how much the ends of the belt 6 move in the right-left direction. The actual position y(s) of the belt 6 detected by the belt-position detecting means 21 is output to the first control means 14 in the control unit 9. In the embodiment, the belt-position detecting means 21 are attached to positions on the lower side of the lower flat surface 7D of the belt 6 and close to the driven drum 5, and can detect, in a short time, the change in position of the belt 6 made when the driven drum 5 rocks.

The actual position y(s) of the belt 6 detected by the belt-position detecting means 21 and a target position r(s) of the belt 6 are input to the first control unit 31. The target position r(s) of the belt 6 is a reference position of the belt 6 in a state in which the belt 6 does not meander, and is given to the first control unit 31 beforehand. The first control unit calculates a deviation amount e(s) of the belt 6 by subtracting the target position r(s) of the belt 6 from the detected actual position y(s) of the belt 6 (difference between the detected position and the target position of the belt). The calculated deviation amount e(s) of the belt 6 is output to the PID control means 17.

The PID control means 17 calculates a target amount of rocking u1(s) of the drum rocking means 8 from the deviation amount e(s) of the belt 6. More specifically, the PID control means 17 accumulates the deviation amounts e(s) of the belt 6 input at a predetermined sampling period, and calculates the target amount of rocking u1(s) of the drum rocking means 8 on the basis of a proportional gain, an integral gain, and a derivative gain obtained from the accumulated deviation amounts e(s). In this embodiment, a rocking angular velocity is used as the target amount of rocking u1(s). Although the range of the sampling period cannot be necessarily determined because the sampling period variously changes according to the sizes, operating conditions, and so on of the belt 6 and the driven drum 5, it is set at 10 to 200 ms, preferably, 10 to 50 ms. The rocking angular velocity u1(s) calculated by the PID control means 17 is output to the second control means 15.

In the drum rocking means 8, the driven drum 5 is rocked via the rocking shaft portion 12 driven by the servomotor 11 in a direction to remove deviation of the belt 6. However, in actuality, even when the driven drum 5 is rocked, a fixed time is required before the belt 6 influenced by the rock of the driven drum 5 reaches a position where the belt-position detecting means 21 is provided and the belt-position detecting means 21 evaluates the influence of rock of the driven drum 5. Although this time changes according to the positional relationship between the belt-position detecting means 21 and the drum rocking means 8, if the time is long, a time in which the belt 6 makes about one rotation is required. That is, the belt 6 has a time constant considerably greater than that of the servomotor 11 or a hydraulic cylinder that is generally used for tilting the drum. Depending on the control period, the influence of response delay remains in the next control period, and this may result in insufficient control over the position of the belt 6. Accordingly, the belt meandering preventing device 1 of the present invention includes the second control means 15 as well as the above-described first control means 14.

The second control means 15 detects the amount of rocking of the driven drum 5, and controls the drum rocking means 8 so that the detected drum amount of rocking becomes the target amount of rocking. The second control means 15 includes the rocking-amount detecting means 13 that detects an actual amount of rocking of the driven drum 5 rocked by the drum rocking means 8, and a second control unit 32 that controls the drum rocking means 8 so that the amount of rocking of the driven drum 5 detected by the rocking-amount detecting means 13 becomes the target amount of rocking. In this embodiment, a rocking angular velocity θ' of the driven drum 5 is used as the amount of rocking.

The rocking-amount detecting means 13 is provided in a portion of the rocking shaft portion 12 in the up-down direction. The rocking-amount detecting means 13 is formed by an encoder that measures the rotational displacement amount of the servomotor 11, and detects an actual rocking angle θ of the driven drum 5 from the rotational displacement amount of the servomotor 11. The actual rocking angle θ of the driven drum 5 detected by the rocking-amount detecting means 13 is output to the second control unit 32.

The second control unit 32 feeds back and inputs the actual rocking angle θ of the driven drum 5 detected by the rocking-amount detecting means 13 to an input side of the drum rocking means 8. More specifically, the second control unit 32 calculates a rocking angular velocity θ' of the driven drum 5 from the actual rocking angle θ input from the rocking-amount detecting means 13. Further, the rocking angular velocity $u1(s)$ calculated by the first control means 14 is also input to the second control unit 32. The second control unit 32 calculates the rocking angular velocity $u(s)$ on the basis of the rocking angular velocity $u1(s)$ and the rocking angular velocity θ'. The second control unit 32 outputs the calculated rocking angular velocity $u(s)$ to the servomotor 11 of the drum rocking means 8, thereby correcting deviation of the belt 6.

Next, a description will be given of an operation performed by the control unit 9, that is, a belt meandering preventing method for a running test device according to the embodiment.

The belt meandering preventing method for the running test device according to the embodiment rocks the driven drum 5 (the other drum) by using the drum rocking means 8, detects a rocking angle θ (amount of rocking) of the driven drum 5, and controls the drum rocking means 8 so that the rocking angle θ becomes the target amount of rocking.

To conduct a tire running test with the tire test device 2, first, the driving motor 3 is driven to rotate the driving drum 4. When the driving drum 4 rotates, the belt 6 laid between the driving drum 4 and the driven drum 5 also rotates. By bringing the tire T into contact with the upper flat surface of the belt 6, the tire running test is performed.

In this case, the position of the belt 6 is adjusted to be $r(s)$. However, tire lateral force and other disturbances are applied to the belt 6, and these cause meandering and deviation. As a result, the belt 6 deviates from a target position $r(s)$ to an actual position $y(s)$.

In the belt meandering preventing method of the embodiment, first, the actual position $y(s)$ of the belt 6 is detected by the belt-position detecting means 21. The detected actual position $y(s)$ of the belt 6 is fed back to the input side of the first control unit 31 in the first control means 14 so as to be output to the first control unit 31. The target position $r(s)$ of the belt 6 is input as an initial setting (given beforehand) to the first control unit 31. The first control unit 31 obtains a difference of the actual position $y(s)$ of the belt 6 input from the belt-position detecting means 21 from the target position $r(s)$ of the belt 6, and thereby calculates a deviation amount $e(s)$ of the belt 6. The calculated deviation amount $e(s)$ of the belt 6 is output to the PID control means 17 in the first control means 14.

The PID control means 17 calculates a target rocking angular velocity $u1(s)$ of the drum rocking means 8 on the basis of the input deviation amount $e(s)$ of the belt 6. A manner in which the deviation amount $e(s)$ of the belt 6 changes is accumulated in the PID control means 17. The PID control means 17 determines gains (proportional gain, integral gain, and derivative gain) on the basis of the accumulated manner of change in deviation amount $e(s)$ of the belt 6, and calculates the rocking angular velocity $u1(s)$ on the basis of the gains. The calculated rocking angular velocity $u1(s)$ is output to the second control unit 32 in the second control means 15.

In the drum rocking means 8, the driven drum 5 is turned in a direction to remove deviation of the belt 6 via the rocking shaft portion 12 driven by the servomotor 11. However, the time constant is considerably greater when the running position of the belt 6 is moved to the predetermined position than when the servomotor 11 is rocked at a predetermined rocking angular velocity. That is, even when the driven drum 5 is rocked, at least a half rotation to one rotation is required before the rock affects the entire belt 6. For this reason, it is difficult for the actual position of the belt 6 to reach the target value of the belt 6 in the above-described sampling period. Accordingly, in the meandering preventing method for the belt 6 according to the embodiment, the actual amount of rocking (rocking angular velocity) of the driven drum 5 is fed back to the input side of the drum rocking means 8, and the second control means 15 controls the drum rocking means 8 so that the rocking angular velocity of the driven drum 5 becomes the target rocking angular velocity.

The second control means 15 performs control as follows. First, the encoder (rocking-amount detecting means 13) provided on the rocking shaft portion 16 of the frame member 12 measures and outputs a rotational displacement amount of the servomotor 11 to the second control unit 32. The second control unit 32 calculates an actual rocking angular velocity θ' of the driven drum 5 from the rotational displacement amount. Further, the second control unit 32 subtracts the actual rocking angular velocity θ' of the driven drum 5 from the rocking angular velocity $u1(s)$ input from the first control unit 31 in the first control means 14, thereby calculating a rocking angular velocity $u(s)$. Then, the second control unit 32 outputs the calculated rocking angular velocity $u(s)$ to the drum rocking means 8. That is, the second control unit 32 controls the drum rocking means 8 so that the driven drum 5 rocks at the rocking angular velocity $u(s)$.

When the drum rocking means 8 is thus controlled by the second control means 15, it is possible to remove or reduce the influence of the time constant of the belt 6 considerably greater than that of the servomotor 11 in the drum rocking means 8 and to quickly correct the belt to the target position. This reliably prevents meandering and vibration of the belt 6 due to the tire lateral force and other disturbances.

First Experimental Example

Next, a description will be given of the belt meandering preventing device 1 and the belt meandering preventing method of the first embodiment in conjunction with an experimental example corresponding to the first embodiment and a comparative example.

A tire test device 2 used in the example and the comparative example has a structure in which a tire T (outer diameter: 120 mmφ, tire width: 50 mm) is in contact with an upper flat surface 7U of a belt 6 (belt width: 100 mm, belt length: 977 mm, belt thickness: 0.1 mm) laid between a driving drum 4 (outer diameter: 120 mmφ, drum width 200 mm) and a driven drum 5 (outer diameter 120 mmφ, drum width 200 mm) that are arranged in parallel.

A belt meandering preventing device 1 includes a servomotor 11 that rocks the driven drum 5 on an axis extending in the up-down direction, and can rock the driven drum 5 via a frame member 10 by the servomotor 11. A light-transmissive sensor for detecting the position of the belt 6 at a sampling period of 15 Hz (6.7 ms) is attached as a belt-position detecting means 20 to a control unit 9 in the belt meandering preventing device 1.

Figure 4:
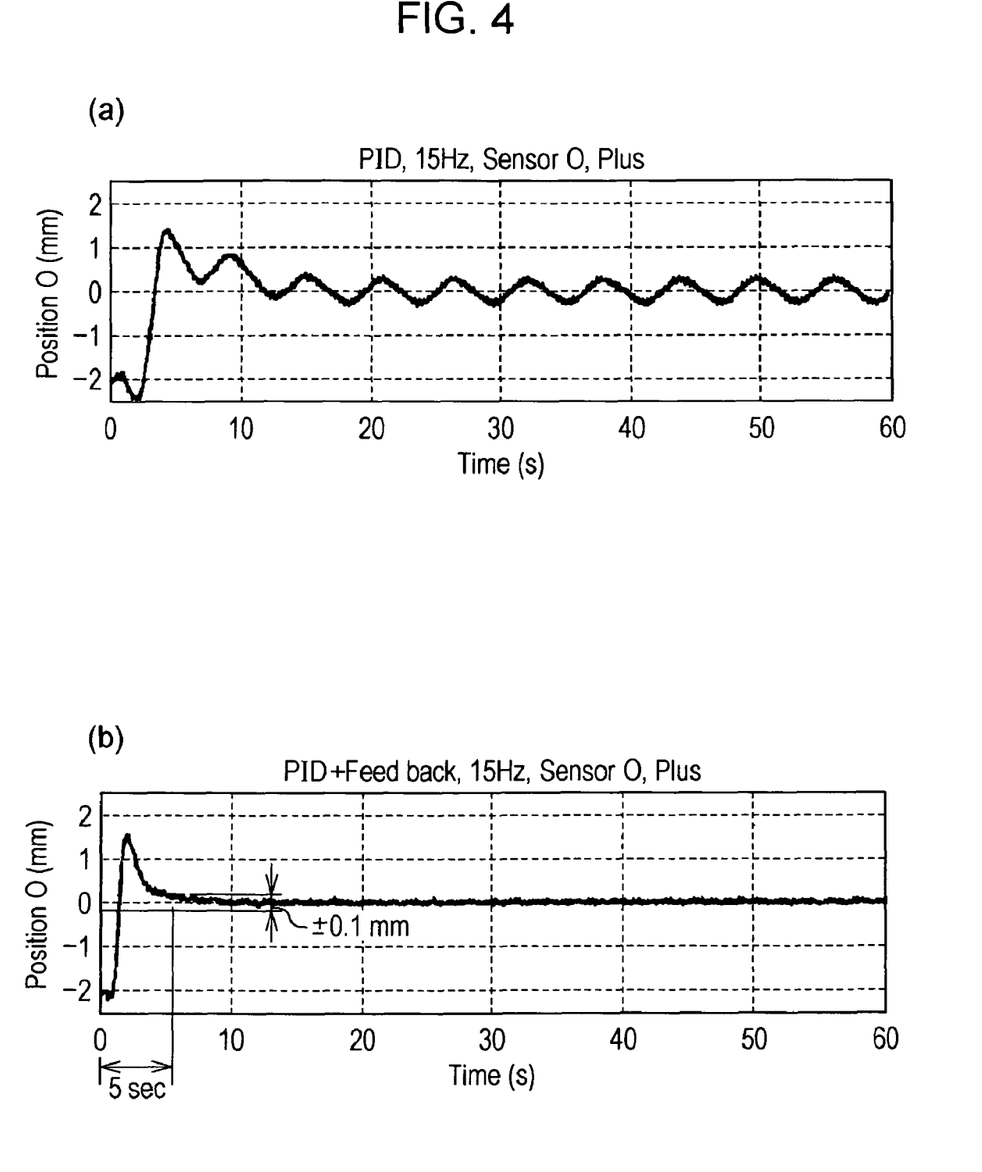

To clarify the differences of advantage, displacement of the position of the belt 6 caused until 60 seconds elapsed from the start of control was measured in the example and the comparative example. Measurement of the position of the belt 6 was started after the position of the belt 6 at the start of control was intentionally deviated by 2 mm from a position where the belt 6 passed without deviation. FIG. 4 shows the result of measurement.

As shown in FIG. 4(a), in the comparative example in which meandering was prevented only by the first control means 14 without using the second control means 15, the influence of the position of the belt 6 at the start of control remained until 15 seconds elapsed from the start of control, and the position of the belt 6 was displaced greatly. Further, even after 15 seconds elapsed from the start of control, a vibration of about ±0.3 mm was observed, and this vibration still remained. In contrast, as shown in FIG. 4(b), in the experimental example in which meandering was prevented by using both the first control means and the second control means 15, the influence of the position of the belt 6 at the start of control disappeared when five seconds elapsed from the start of control, and meandering and deviation of the belt 6 were made smaller in a shorter time than in the comparative example. Although a slight vibration of about ±0.1 mm was also observed after 15 seconds elapsed from the start of control, the amplitude thereof decreased, and vibration was suppressed reliably.

The comparison of the experimental example and the comparative example shows that the position of the belt 6 is quickly corrected and meandering and vibration of the belt 6 are reliably prevented by providing the second control means 15, which controls the drum rocking means 8 so that the amount of rocking of the driven drum 5 actually rocked by the drum rocking means 8 becomes the target amount of rocking in addition to the first control means 14 that controls the drum rocking means 8 so that the position of the belt 6 detected by the belt-position detecting means 21 becomes the target position.

Second Embodiment

Figure 5:
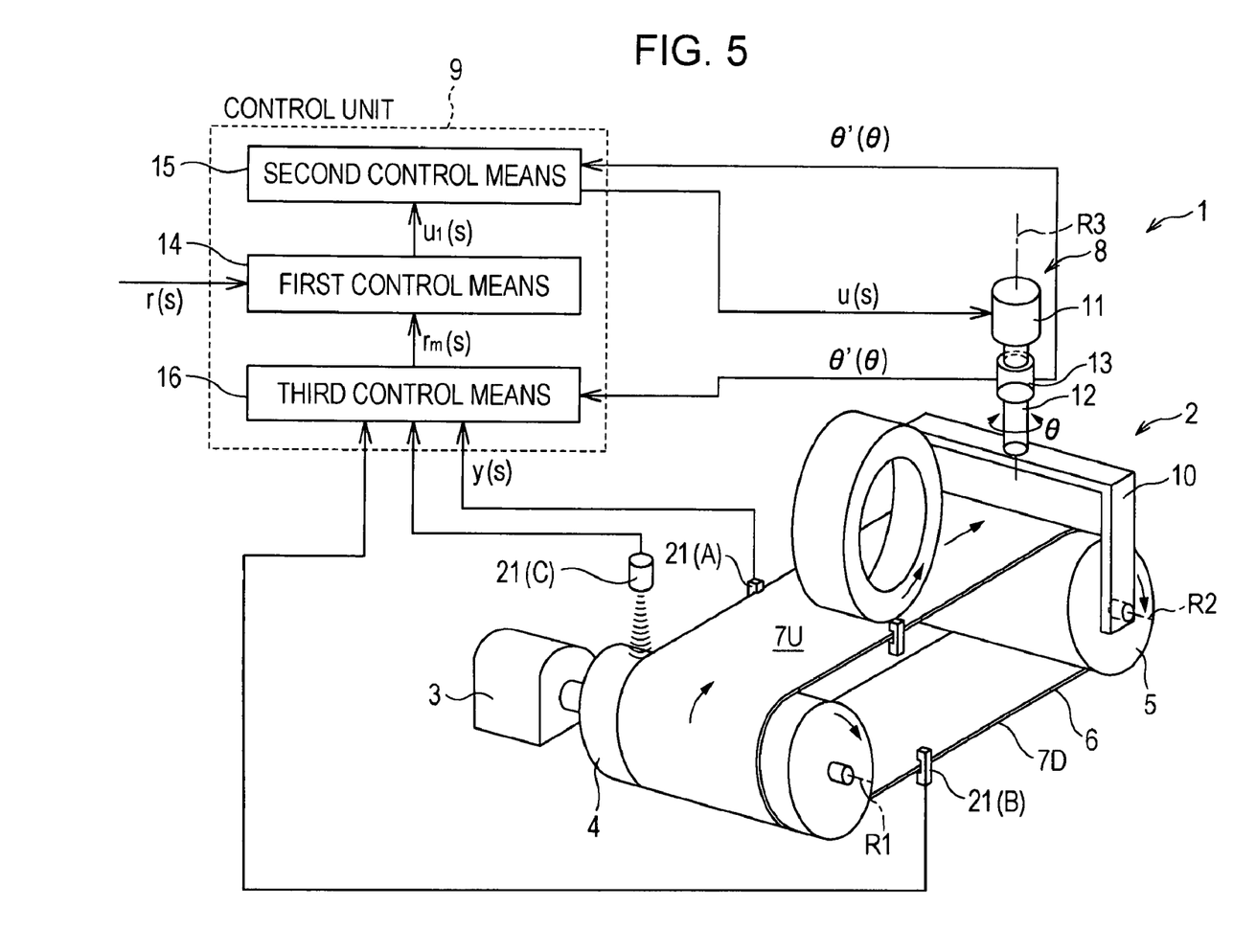
FIG. 5 is a perspective view of a tire test device according to a second embodiment.
Figure 6:
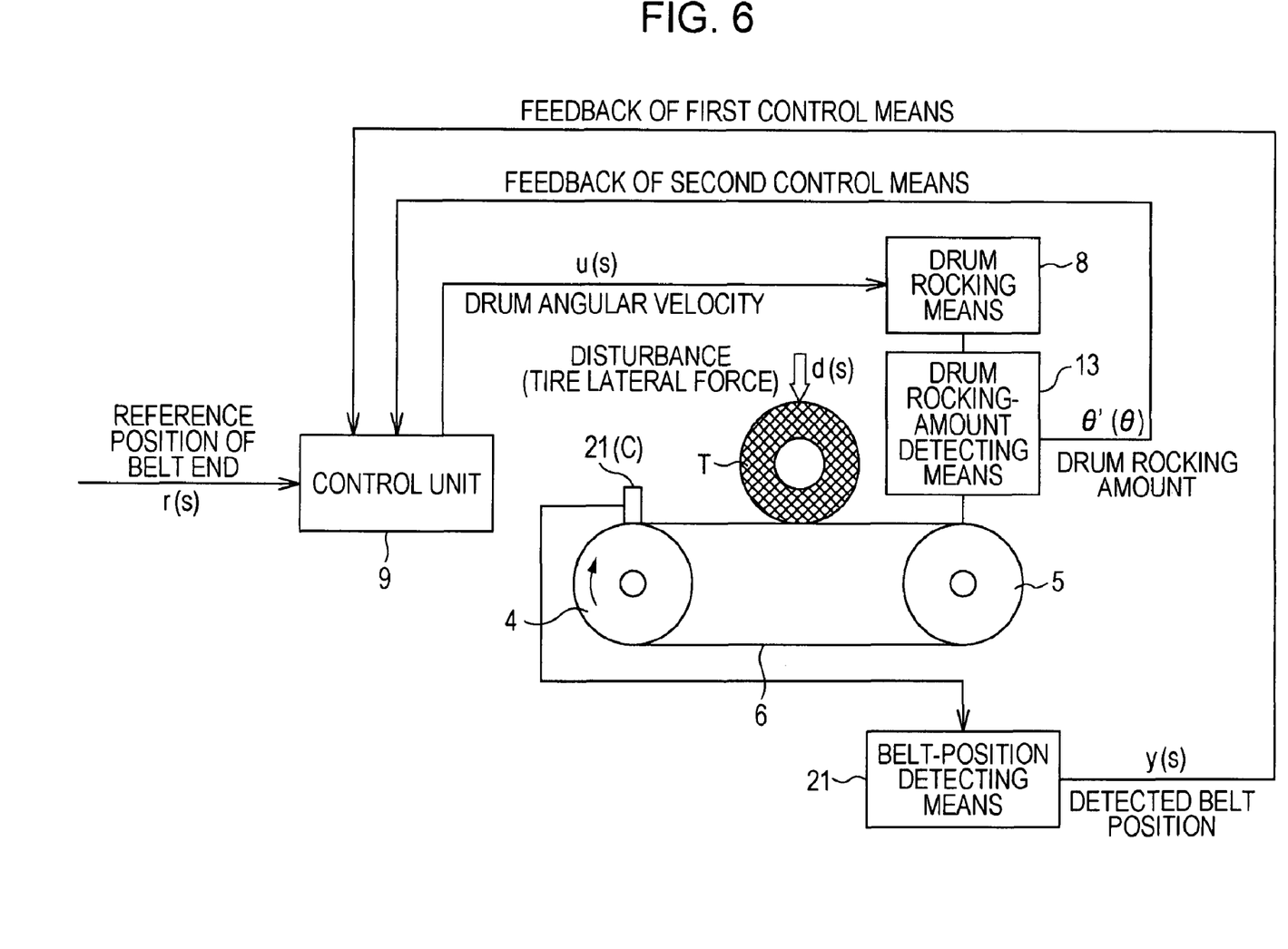
FIG. 6 is a block diagram showing the flow of signals in a belt meandering preventing device.

In a second embodiment of the present invention illustrated in FIGS. 5 and 6, structures of a tire test device 2 and a drum rocking means 8 are similar to those adopted in the first embodiment. This embodiment is different from the first embodiment in the configuration of a control unit 9 and control performed by the control unit 9.

The control unit 9 is formed by a computer or a sequencer, and includes a first control means 14, a second control means 15, and a third control means 16.

Figure 7:
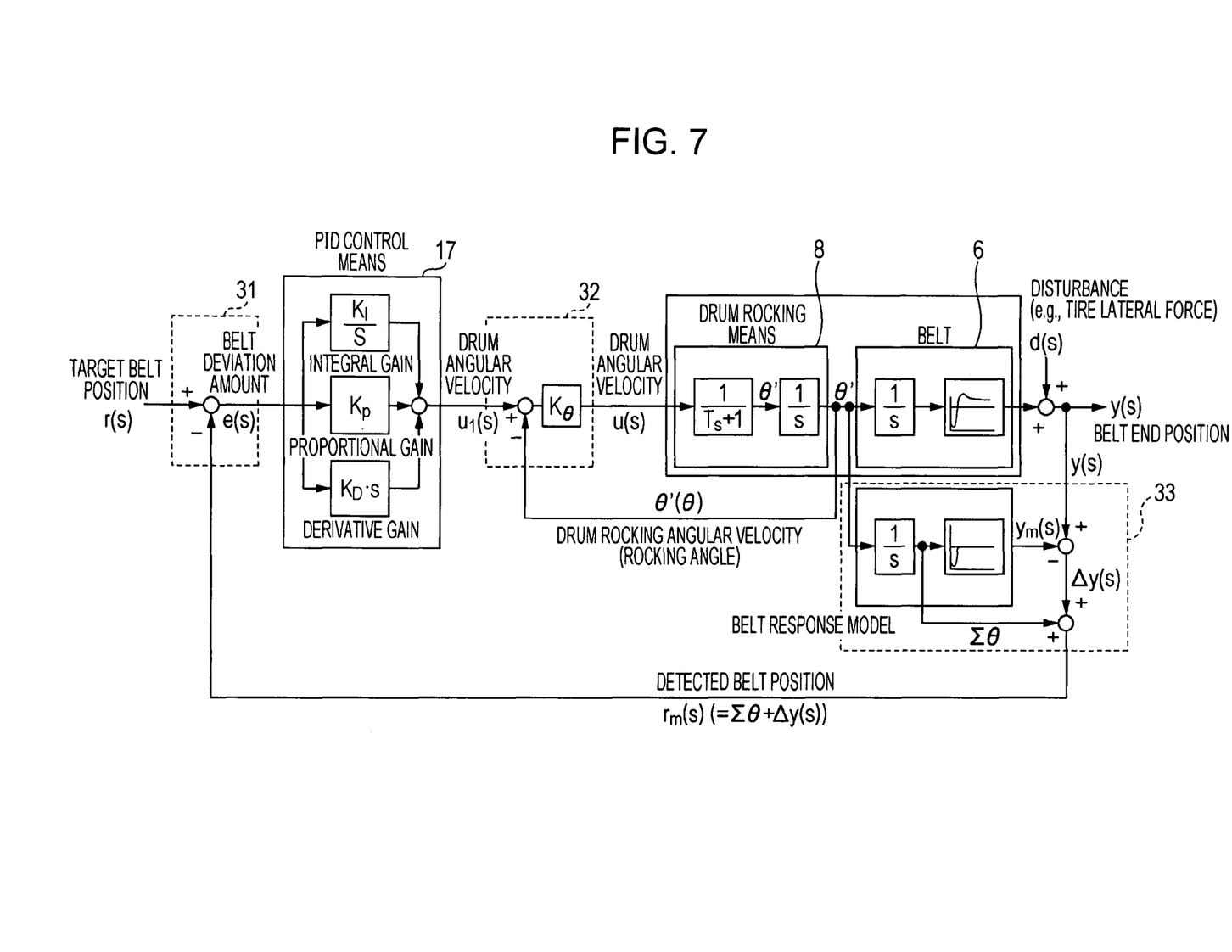
FIG. 7 is a block diagram showing the flow of signals in a control unit.

The first control means 14 controls the drum rocking means 8 so that the difference between an actual position of a belt 6 and a predetermined target position becomes zero. The first control means 14 includes a first control unit 31 that calculates a deviation amount e(s) of a detected position rm(s) of the belt 6 from a target position r(s) input beforehand (difference between the detected position and the target position of the belt), and a PID control means 17 that controls the drum rocking means 8 on the basis of the deviation amount e(s). The position of the belt 6 that does not meander is given as the target position r(s) to the first control unit 31 beforehand, and the deviation amount e(s) is calculated by subtracting the target position r(s) from the detected position rm(s) of the belt 6 calculated by the third control means 16. The calculated deviation amount e(s) of the belt 6 is output to the PID control means 17.

The PID control means 17 calculates a target amount of rocking u1(s) on the basis of the deviation amount e(s) of the belt 6 input from the first control unit 31, and outputs this amount of rocking u1(s) to the second control means 15. In this embodiment, a rocking angular velocity is used as the amount of rocking u1(s). Although the range of control period cannot be necessarily determined because the control period variously changes according to the sizes, operating conditions, and so on the belt 6 and the driven drum 5, it is set at 10 to 200 ms, preferably, 10 to 50 ms.

The second control means 15 includes a rocking-amount detecting means 13 that detects an actual amount of rocking of the driven drum 5 rocked by the drum rocking means 8, and a second control unit 32 that controls the drum rocking means 8 so that the amount of rocking of the drum detected by the rocking-amount detecting means 13 becomes the target amount of rocking.

The rocking-amount detecting means 13 is formed by an encoder that measures the rocking angle of a servomotor 11, and detects an actual rocking angle θ of the driven drum 5 from the rocking angle of the servomotor 11. The actual rocking angle θ of the driven drum 5 detected by the rocking-amount detecting means 13 is output to the second control unit 32. The second control unit 32 feeds back and inputs the actual rocking angle θ of the driven drum 5 detected by the rocking-amount detecting means 13 to an input side of the drum rocking means 8. The rocking angular velocity u1(s) calculated by the first control unit 31 in the first control means 14 is input to the second control unit 32, and the second control unit 32 calculates the amount of rocking, more specifically, a rocking angular velocity u(s) on the basis of the rocking angular velocity u1(s) and the rocking angle θ of the driven drum 5 detected by the rocking-amount detecting means 13. The second control unit 32 outputs the calculated rocking angular velocity u(s) to the servomotor 11 of the drum rocking means 8, thereby correcting deviation of the belt 6 in a short time.

In the drum rocking means 8, the servomotor 11 rotates on the basis of the rocking angular velocity u1(s) calculated by the first control unit 31 and the rocking angular velocity u(s) calculated by the second control unit, and the driven drum 5 rotates in a direction to remove the deviation amount e(s) of the belt 6. However, in actuality, even when the driven drum 5 is rocked, a fixed time is required before the belt 6 influenced by the rock of the driven drum 5 reaches a position where a below-described belt-position detecting means 21 is provided and the belt-position detecting means 21 evaluates the influence of rock of the driven drum 5. Although this time changes according to the positional relationship between the belt-position detecting means 21 and the drum rocking means 8, if the time is long, a time in which the belt 6 makes about one rotation is required. That is, the belt 6 has a time constant considerably greater than that of the servomotor 11 or a hydraulic cylinder that is generally used for tilting the drum. Depending on the control period, the influence of this response delay may remain in the next control period and this may result in insufficient control over the position of the belt 6.

It is known, from previous findings, that, even when the time constant of the locus change of the belt 6 elapses, a transient phenomenon in which the belt 6 responds in a direction opposite a direction of stabilization occurs in the belt 6 immediately after the influence of rock of the driven drum 5 appears. If such a transient phenomenon occurs, an unnecessary displacement amount resulting from the response in the opposite direction is added to the deviation amount of the position of the belt 6 detected by the belt-position detecting means 21, and this may cause insufficient control over the position of the belt 6. Accordingly, the belt meandering preventing device 1 of the present invention includes the third control means 16 that calculates the detected position of the belt 6 from which the response delay and response in the opposite direction are removed, in addition to the first control means 14 and the second control means 15 described above.

More specifically, the third control means 16 includes the belt-position detecting means 21 that detects a measured position y(s) of the belt 6, and a third control unit 33 that finds an estimated position ym(s) of the belt 6 by inputting the amount of rocking θ of the drum detected by the second control means 15 to a belt response model and calculates a detected position rm(s) of the belt 6 on the basis of a difference Δy(s) between the estimated position ym(s) and the measured position y(s) of the belt 6 and an integral value Σθ obtained by integrating the amount of rocking θ of the drum.

The belt-position detecting means 21 can actually measure the position of an end of the belt 6 wound around the driving drum 4, and in this embodiment, is provided at a fixed distance above from the belt 6 near the boundary between an upper flat surface 7U and the driving drum 4. The belt-position detecting means 21 can detect the measured position y(s) of the belt 6 by applying infrared rays onto the belt 6 and receiving reflected light. The measured position y(s) of the belt 6 detected by the belt-position detecting means 21 is output to the third control unit in the control unit 9.

The rocking angle θ of the driven drum 5 detected by the rocking-amount detecting means 13 in the second control means 15 and the measured position y(s) of the belt 6 detected by the belt-position detecting means 21 are input to the third control unit 33. The third control unit 33 finds an estimated position ym(s) of the belt 6 by inputting the amount of rocking θ of the driven drum 5 to a belt response model, and calculates a deviation amount Δy(s) of the belt 6 on the basis of the estimated position ym(s) and the measured position y(s) of the belt 6. Further, the third control unit 33 multiplies an integral value Σθ obtained by integrating the input rocking angle of the belt 6 by a predetermined constant α. From the deviation amount Δy(s) and the product of the integral value Σθ and the constant α thus found, a detected position rm(s) of the belt 6 from which the influences of the transient response and the influence of response delay of the belt 6 are removed (=αΣθ2+Δy(s)) is calculated. The calculated detected position rm(s) of the belt 6 is output to the first control unit 31, and is used in the first control means 14 so as to calculate a target rocking angular velocity u1(s) on the basis of the detected position rm(s) of the belt 6.

The belt response model can reproduce the actual belt behavior caused when the driven drum 5 is rocked, and is formed by a discrete model or a dynamic model based on actual data on the measured belt behavior.

Next, a description will be given of operation performed in the control unit 9, that is, a belt meandering preventing method for a running test device according to the present invention.

In the belt meandering preventing method for the running test device according to the present invention, the driven drum (the other drum) is rocked by the drum rocking means 8, a rocking angle θ (amount of rocking) of the driven drum 5 is detected, and the drum rocking means 8 is first controlled so that the rocking angle θ becomes the target amount of rocking. Next, an estimated position ym(s) of the belt 6 is found by inputting the rocking angle θ to a belt response model, a difference Δy(s) between the estimated position ym(s) and the actually detected measured position y(s) of the belt 6 is found, a detected position rm(s) of the belt 6 is found on the basis of an integral value Σθ of the rocking angle θ and the difference Δy(s), and the drum rocking means 8 is controlled so that the difference between the detected position rm(s) of the belt 6 and the predetermined target position r(s) becomes zero. More specifically, this belt meandering preventing method is performed as follows.

When conducting a running test on the tire T with the tire test device 2, first, the driving motor 3 is driven to rotate the driving drum 4. When the driving drum 4 rotates, the belt 6 laid between the driving drum 4 and the driven drum 5 also rotates. Then, the running test for the tire T is conducted by bringing the tire T into contact with the upper flat surface 7U of the belt 6.

In this case, the position of the belt 6 is adjusted to be at the target position r(s). However, tire lateral force and other disturbances are applied to the belt 6, and these cause meandering and deviation. As a result, the actual belt 6 deviates from the target position r(s) to the measured position y(s).

If the rocking angular velocity u1(s) calculated by the first control means 14 is input to the drum rocking means 8 and the servomotor 11 operates in the drum rocking means 8 so that the amount of rocking (rocking angular velocity) becomes u1(s), the driven drum 5 rotates via the frame member 10 in a direction to remove deviation of the belt 6. However, a certain time constant exists even when the driven drum 5 is rocked at a predetermined angular velocity. Hence, even if the drum rocking means 8 is controlled in the above-described sampling period so as to obtain the rocking angular velocity u1(s), it is difficult for the actual rocking angle θ (amount of rocking) of the driven drum 5 to reach the target value. Accordingly, in the second control means 15, the actual rocking angle θ of the driven drum 5 is detected by the rocking-amount detecting means 13, and the detected rocking angle θ is fed back to the input side of the second control unit, whereby the drum rocking means 8 is controlled so that the driven drum 5 is rocked at the rocking angular velocity u(s).

When the drum rocking means 8 is thus controlled by the second control means 15, the driven drum 5 is rocked to the target amount of rocking (rocking angle or rocking angular velocity) and meandering and vibration of the belt 6 due to the delay of the drum rocking means 8 can be prevented. However, even when the driven drum 5 is rocked to the target amount of rocking, the influence of a transient response and the influence of response delay occur in the belt 6 to which the rock of the driven drum 5 is transmitted, as described above. Hence, if the drum rocking means 8 is controlled by feeding back the measured position y(s) of the belt 6 detected by the belt-position detecting means 21 to the first control means 14 unchanged, the belt 6 causes overshooting and oscillation, and this makes sufficient control impossible.

Accordingly, in the belt meandering preventing method of the embodiment, the rocking angle θ input to the second control unit in the second control means 15 is also input to the third control unit 33, and the estimated position ym(s) of the belt 6 is found by inputting the input rocking angle θ to the belt response model.

Next, in the third control unit 33, the difference Δy(s) between the estimated position ym(s) of the belt 6 calculated using the belt response model and the measured position y(s) of the belt 6 is calculated, and this difference Δy(s) is treated as the deviation amount of the belt 6.

Further, in the third control unit 33, the integral value Σθ is obtained by integrating the input rocking angle θ of the driven drum 5. This integral value Σθ represents the tilting angle of the driven drum 5 at the time of detection. By multiplying the integral value Σθ (tilting angle of the driven drum 5) by the predetermined constant, the position of the belt 6, from which the influence of the transient response and the influence of response delay of the belt 6 are removed, can be calculated.

For this reason, in the third control unit 33, the detected position rm(s) (=αΣθ+Δy(s)) of the belt 6, from which the influence of the transient response and the influence of response delay of the belt 6 are removed, is found by adding the difference Δy(s) obtained on the basis of the belt response model and the position of the belt 6 obtained as the product of the integral value Σθ and the constant α. The detected position rm(s) of the belt 6 thus found is input to the above-described first control means 14, and the first control unit controls the drum rocking means 8 so that the difference between the detected position rm(s) of the belt 6 and the predetermined target position r(s) becomes zero.

By thus controlling the amount of rocking of the driven drum on the basis of the detected position rm(s) of the belt 6 calculated using the belt response model, overshooting and oscillation caused before stabilization to the target position r(s) can be prevented, and the position of the belt 6 can be quickly corrected to the target position. This reliably prevents meandering and vibration of the belt 6.

Second Experimental Example

Next, a description will be given of the belt meandering preventing device 1 and the belt meandering preventing method of the second embodiment in conjunction with an experimental example corresponding to the second embodiment and a comparative example.

A tire test device 2 used in the experimental example and the comparative example has a structure in which a tire T (outer diameter: 120 mmφ, tire width: 50 mm) is in contact with an upper flat surface 7U of a belt 6 (belt width: 100 mm, belt length: 977 mm, belt thickness: 0.1 mm) laid between a driving drum 4 (outer diameter: 120 mmφ, drum width 200 mm) and a driven drum 5 (outer diameter 120 mmφ, drum width 200 mm) that are arranged in parallel.

A belt meandering preventing device 1 includes a servomotor 11 that rocks the driven drum 5 on an axis extending in the up-down direction, and can rock the driven drum 5 via a frame member 10 by the servomotor 11. A light-reflective sensor C for detecting the position of the belt 6 at a sampling period of 15 Hz (6.7 ms) is attached as a belt-position detecting means 20 to the belt meandering preventing device 1. For comparison of the sensor setting position, a light-transmissive sensor (sensor A) is provided on the upper flat surface 7U near the tire T and a light-transmissive sensor (sensor B) is provided on a lower flat surface 7D near the driving drum 4.

Figure 8:
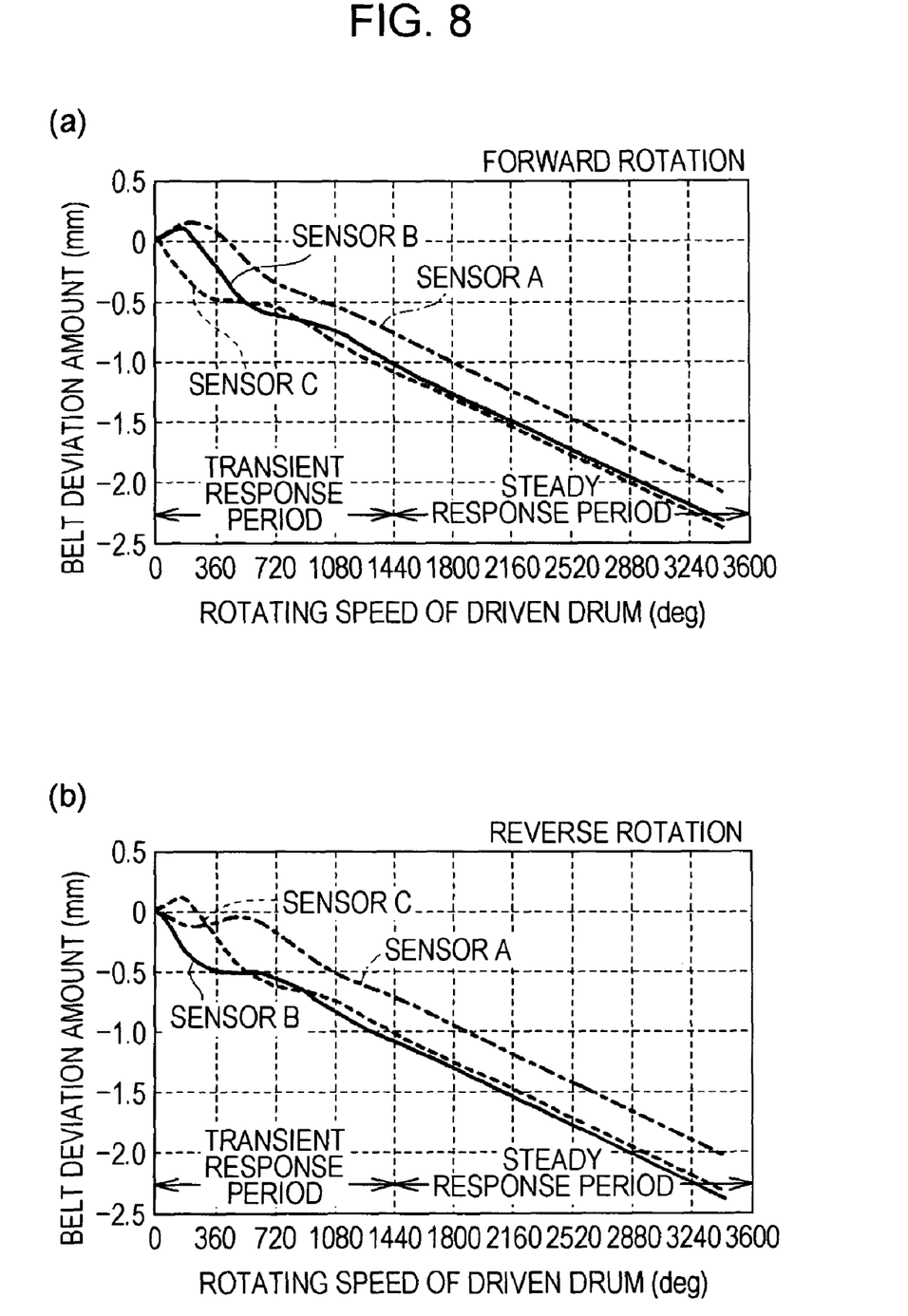
FIG. 8 shows the change in deviation amount of a belt with respect to the rotating angle of a driven drum.

First, a calculation method for a belt response model provided in a third control unit 33 of the belt meandering preventing device 1 of the experimental example will be described below by taking a model that compensates only inverse response as an example. FIG. 8 shows measured positions of the belt 6 detected by the light-reflective sensor and the light-transmissive sensors described above when the belt 6 is rotated in a state in which the driven drum 5 is tilted 0.25° beforehand.

As shown in FIG. 8(a), when the belt 6 is rotated in the forward direction, changes in the plus direction of the measured position of the belt 6 detected by the sensor A and the sensor B were observed in a transient response time at the beginning of control (the rotation angle of the driven drum 5 is 0 to 1440 degrees). This shows that the belt 6 is displaced in the direction opposite the minus direction for correction. Further, as shown in FIG. 8(b), when the belt 6 is rotated in the reverse direction, a change in the plus direction of the measured position of the belt 6 detected by the sensor C was observed. This shows that, even when the mounting position of the belt-position detecting means 21 is changed in the running test device that rotates the belt 6 in the forward and reverse directions, inverse response occurs, that is, the belt 6 is displaced, in the direction opposite either of the rotating directions for correction.

Accordingly, the experimental example uses a belt response model in which the change in deviation amount of the belt 6 with respect to the rotation angle of the driven drum 5 is expressed in an IIR discrete expression given by Expression (1).

Figure 9:
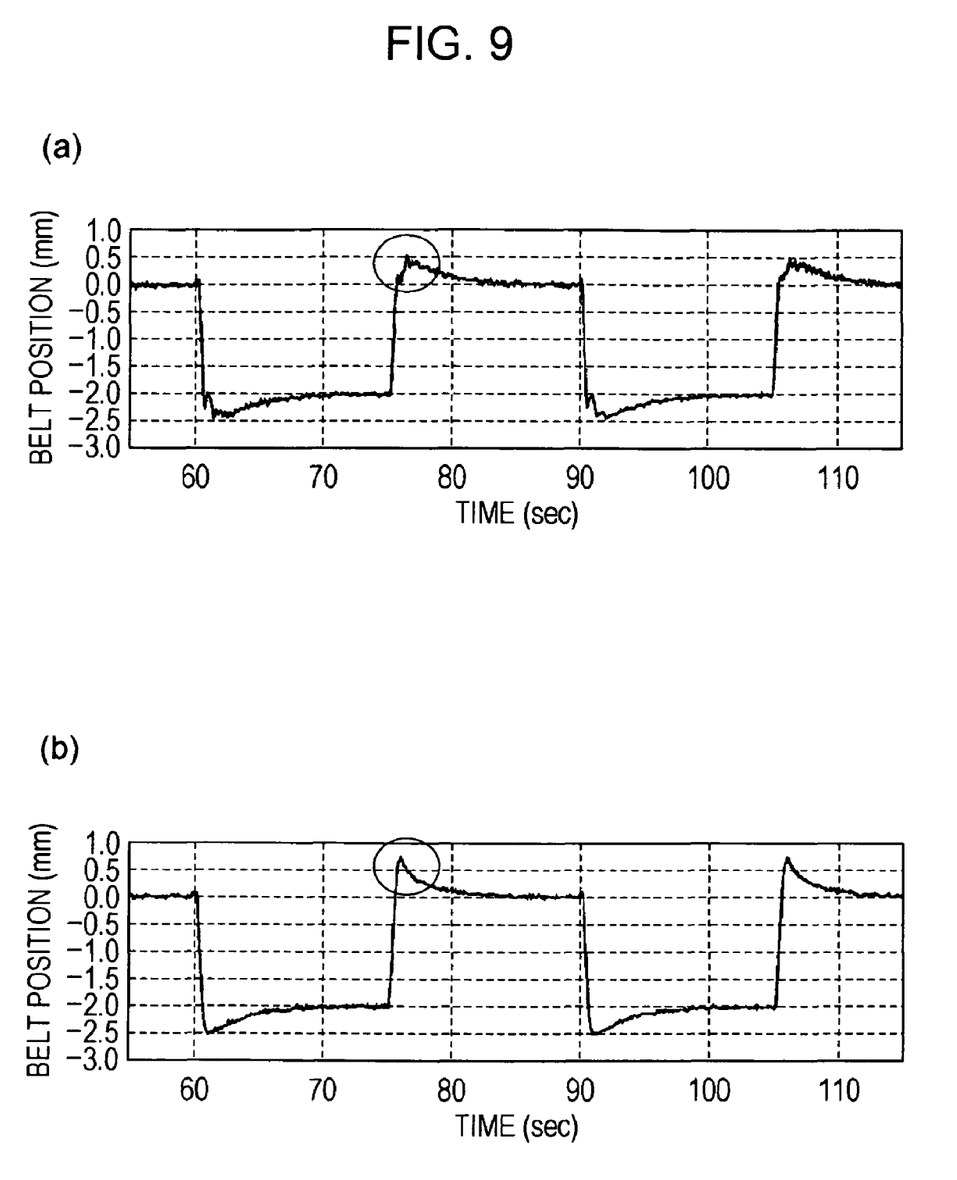
Figure 10:
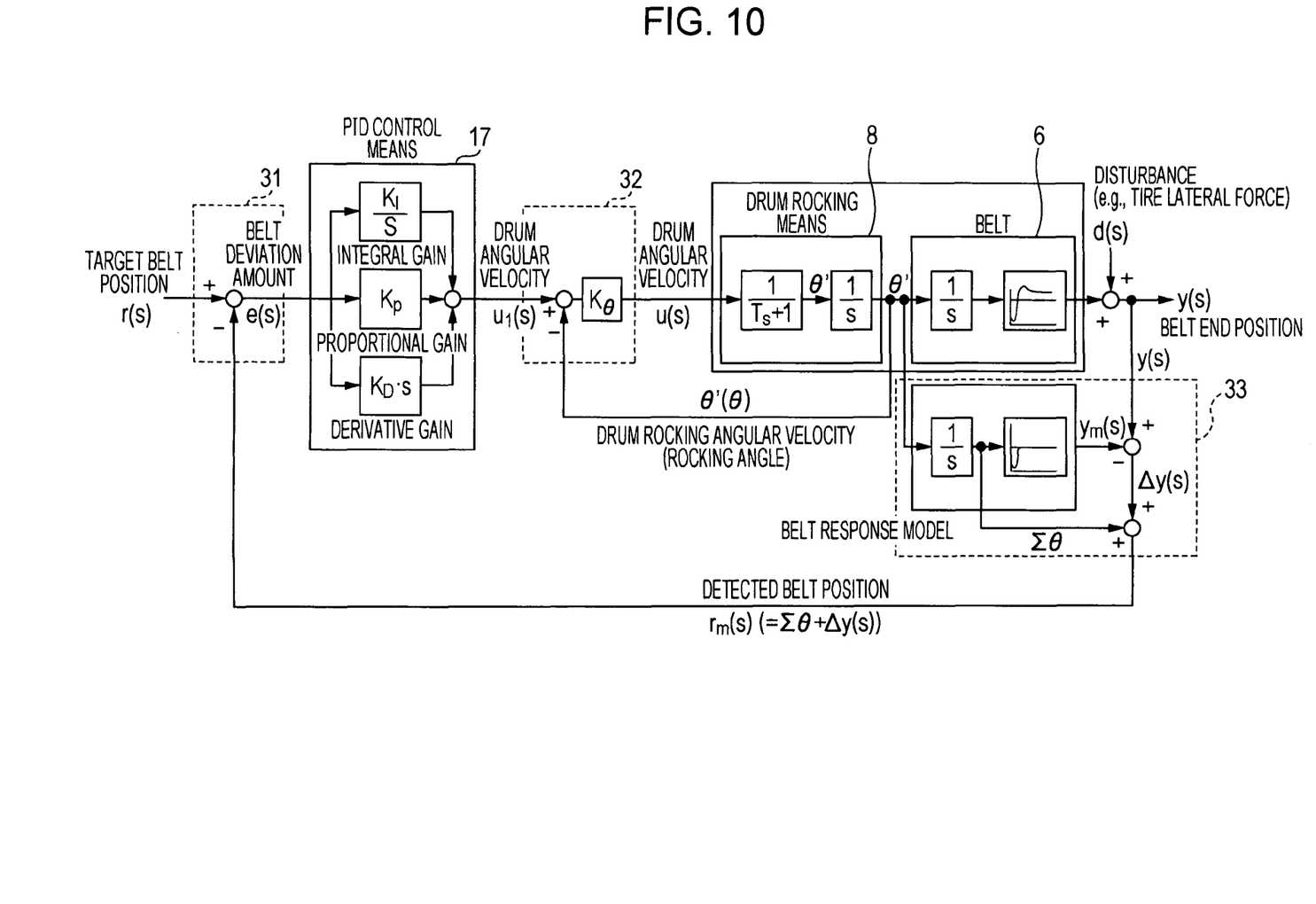
FIG. 10 is a block diagram showing the flow of signals in a control unit using a belt response model that simulates the delay in belt response in addition to the inverse response behavior.

[Eq. 1]

$$d_0 y(n) = n_1 u(n+1) + n_2 u(n+2) - d_1 y(n+1) - d_2 y(n+2) \quad (1)$$

$$d_0 = (1) \times \frac{1}{dt^2} + (2 \times 0.7 \times v) \times \frac{1}{2 \times dt} + (v+v) \times \frac{1}{4}$$

$$d_1 = (1) \times \frac{-2}{dt^2} + (v \times v) \times \frac{1}{4}$$

$$d_2 = (1) \times \frac{1}{dt^2} - (2 \times 0.7 \times v) \times \frac{1}{2 \times dt} + (v \times v) \times \frac{1}{4}$$

$$n_1 = (-4.0688 \times v \times v) \times \frac{1}{dt}$$

$$n_2 = -(-4.0688 \times v \times v) \times \frac{1}{dt}$$

y(n): differential value of deviation amount of measured belt position
y(n): rocking angle of servomotor
v: rotation speed of belt represented by rotation frequency (Hz)
n: step time When the detected position rm(s) of the belt 6 calculated using the belt response model given by Expression (1) is applied to only a derivative component of the PID control means 17 (only a derivative gain in FIG. 7), the position of the belt 6 changes (result of the example), as shown in FIG. 9(a). In contrast, when the drum rocking means 8 is controlled using the measured position y(s) detected by the sensor B unchanged without using the belt response model, the position of the belt 6 changes (result of the comparative example, as shown in FIG. 9(b). Comparing the changes in position of the belt 6 at circled positions in FIG. 9, the change in position of the belt 6 in the result of the example is smaller than in the result of the comparative example, and it is therefore known that overshooting of the belt 6 is suppressed. This shows that overshooting and oscillation of the belt 6 can be reliably prevented and the position of the belt 6 can be quickly corrected to the target position, and meandering and vibration of the belt 6 can be reliably prevented by controlling the drum rocking means 8 on the basis of the detected position rm(s) calculated using the belt response model.

In this embodiment, the example that simulates the behavior of the belt 6 in the direction opposite the target position is given as the belt response model. However, for example, a belt response model that can simulate the dead time (delay) of the belt response in addition to the behavior of inverse response shown in FIG. 9 may be used. When it is unnecessary to consider the behavior of inverse response, a belt response model that reflects only the dead time can be used.

The present invention is not limited to the above embodiments, and the shapes, structures, materials, combinations, etc. of the members can be appropriately changed without departing from the essence of the present invention.

In the above embodiments, the servomotor 11 is used in the drum rocking means 8. However, the drum rocking means 8 is not limited only to the servomotor 11. For example, arms extending in the front-rear direction can be provided on either sides of the driven drum 5, and the driven drum 5 can be rocked by expanding and contracting the arms in the front-rear direction by a hydraulic cylinder or the like. In this case, it is better to control the expansion and contraction amount of the hydraulic cylinder instead of the rocking angular velocity of the servomotor 11.

Also, in the above embodiments, the drum rocking means 8 rocks the driven drum 5 on the rocking shaft portion 12. However, the rocking direction of the driven drum 5 is not limited to the direction around the rocking axis R3. For example, the driven drum 5 can be rocked on an axis extending in the front-rear direction by moving any end of the driven drum 5 in the up-down direction.

In the above embodiments, the drum rocking means 8 rocks the driven drum 5 relative to the driving drum 4. Alternatively, the drum rocking means 8 may rock the driving drum 4 relative to the driven drum 5.

In the above-embodiments, the second control means 15 feeds back the rocking angular velocity of the driven drum 5 measured by the encoder to the input side of the drum rocking means 8. Alternatively, the second control means 15 can feed back the rocking angle or the rocking angular velocity of the driven drum 5 to the input side of the drum rocking means 8.

In the above embodiments, the reflective infrared sensor provided on the upper flat surface 7U of the belt 6 is used in the belt-position detecting means 21. However, the sensor used in the belt-position detecting means 21 does not always need to be a reflective sensor or an infrared sensor. Further, the belt-position detecting means 21 may be set at any position where the belt-position detecting means 21 can detect the position of the end of the belt 6. For example, a transmissive light sensor may be provided on the lower flat surface 7D, or may be provided above the driven drum 5.

The invention claimed is:

1. A belt meandering preventing device for a running test device, the belt meandering preventing device being provided in the running test device that evaluates a running characteristic of a rolling element while the rolling element is in contact with a belt laid between a pair of drums, and correcting meandering of the belt by drum rocking means that rocks, relative to one of the drums, the other drum and that changes a position of the belt in accordance with an amount of rocking of the other drum, the belt meandering preventing device comprising:
   first control means that detects the position of the belt and controls the drum rocking means so that a difference between the detected position of the belt and a predetermined target position becomes zero; and
   second control means that detects the amount of rocking of the other drum rocked by the drum rocking means and controls the drum rocking means so that the detected amount of rocking of the drum becomes a target amount of rocking.

2. The belt meandering preventing device for the running test device according to claim 1, wherein the second control means detects the amount of rocking of the other drum, calculates a difference between the detected amount of rocking and the target amount of rocking, and feeds back the difference in the amount of rocking to an input side of the drum rocking means.

3. The belt meandering preventing device for the running test device according to claim 2, wherein the first control means calculates the difference between the detected position of the belt and the target position, and feeds back the difference to the input side of the drum rocking means.

4. The belt meandering preventing device for the running test device according to claim 1, further comprising third control means that calculates a difference between an estimated position of the belt obtained by inputting the amount of rocking of the drum detected by the second control means to a belt response model and a measured position of the belt detected by belt-position detecting means, calculates an integral value obtained by integrating the amount of rocking of the drum, and calculates a detected position of the belt on the basis of the difference and the integral value.

5. The belt meandering preventing device for the running test device according to claim 4, wherein the belt response model simulates a response behavior of the belt in a direction opposite the target position and/or response delay of the belt.

6. The belt meandering preventing device for the running test device according to claim 3, wherein the first control means includes PID control means that calculates a target amount of rocking of the drum rocking means from the difference between the detected position and the target position of the belt.

7. The belt meandering preventing device for the running test device claim 1, wherein the amount of rocking is a rocking angle or a rocking angular velocity of the other drum.

8. A belt meandering preventing method for a running test device, which corrects meandering of a belt laid between a pair of drums by drum rocking means that is provided in the running test device for evaluating a running characteristic of a rolling element while the rolling element is in contact with the belt and that rocks, relative to one of the drums, the other drum, and that changes a position of the belt in accordance with an amount of rocking of the other drum, the belt meandering preventing method comprising:
   detecting the position of the belt and controlling the drum rocking means so that a difference between the detected position and a predetermined target position of the belt becomes zero; and
   detecting the amount of rocking of the other drum rocked by the drum rocking means and controlling the drum rocking means so that the detected amount of rocking of the drum becomes a target amount of rocking.

9. The belt meandering preventing method for the running test device according to claim 8, further comprising finding a difference between an estimated position of the belt found by inputting the amount of rocking of the drum to a belt response model and a measured position of the drum actually detected, and finding a detected position of the belt on the basis of an integral value of the amount of rocking of the drum and the difference.

10. The belt meandering preventing method for the running test device according claim 9, wherein the belt response model simulates a response behavior of the belt in a direction opposite the target position and/or response delay of the belt.

* * * * *